F. A. PARKHURST.
METAL MOLD.
APPLICATION FILED OCT. 1, 1917.

1,296,596.

Patented Mar. 4, 1919.
6 SHEETS—SHEET 1.

F. A. PARKHURST.
METAL MOLD.
APPLICATION FILED OCT. 1, 1917.

1,296,596.

Patented Mar. 4, 1919.
6 SHEETS—SHEET 2.

Witness
Edwin L. Bradford

Inventor
Frederic A. Parkhurst
By Ray S. Etter
Attorney

F. A. PARKHURST.
METAL MOLD.
APPLICATION FILED OCT. 1, 1917.

1,296,596.

Patented Mar. 4, 1919.
6 SHEETS—SHEET 3.

F. A. PARKHURST.
METAL MOLD.
APPLICATION FILED OCT. 1, 1917.

1,296,596.

Patented Mar. 4, 1919.
6 SHEETS—SHEET 4.

F. A. PARKHURST.
METAL MOLD.
APPLICATION FILED OCT. 1, 1917.

1,296,596.

Patented Mar. 4, 1919.
6 SHEETS—SHEET 5.

Witness
Edwin L. Bradford

Inventor
Frederic A. Parkhurst
By Ray S. Gehr
Attorney

UNITED STATES PATENT OFFICE.

FREDERIC A. PARKHURST, OF CLEVELAND, OHIO, ASSIGNOR TO THE ALUMINUM CASTINGS COMPANY, OF CLEVELAND, OHIO, A CORPORATION OF OHIO.

METAL-MOLD.

1,296,596.  Specification of Letters Patent.  Patented Mar. 4, 1919.

Application filed October 1, 1917. Serial No. 194,189.

*To all whom it may concern:*

Be it known that I, FREDERIC A. PARKHURST, a citizen of the United States, residing at Cleveland, in the county of Cuyahoga and State of Ohio, have invented certain new and useful Improvements in Metal-Molds, of which the following is a specification, reference being had therein to the accompanying drawing.

The invention relates to permanent molds for the production of hollow castings with internal projections, and particularly of cup-shaped castings such as skirted pistons for internal combustion engines.

Comparatively recently pistons of this kind made of aluminum alloys have come into extensive use, their light weight giving them a marked advantage over the heavier iron pistons. Of these light weight pistons those cast in permanent metal molds have been most successful because of their internal structural characteristics which give the castings great strength and superior machining and bearing qualities.

However, the internal projections characteristic of internal combustion engine pistons of the skirted type have given rise to difficulties which have been very hard to overcome in the production of permanent mold castings. As is well known to those familiar with internal combustion engine practice in the less recent past, the pistons were provided with internal bosses which form the bearing support of the piston pin, usually with an internal rib or ribs which extend from the piston head and the side walls and serve both to strengthen the piston and facilitate the dissipation of heat from the piston head, and also with an internal annular, circumferentially extending flange or thickening of the side wall at or near the bottom or open end of the piston, such flange or thickening of the wall serving to stiffen it sufficiently to prevent deformation under the action of the lateral stresses incident to the angularity of the connecting rod and serving also, in some cases, to permit the cutting of one or more external wiping ring grooves.

Up to the time of my invention considerable progress had been made in the development of permanent molds for the production of piston castings, and permanent metal molds having sectional cores have been produced in which it was possible to cast pistons with internal pin bosses and head ribs, but it had been impossible to produce pistons of the character in question with an internal circumferential flange at or near the bottom of the piston skirt because of the difficulties incident to supporting the core parts accurately and rigidly and to providing clearance necessary for the withdrawal of the core parts.

Accordingly, up to the time of my invention, one of three alternative courses had been followed in the production of these permanent mold pistons, namely, (1) the side walls of the pistons were thickened throughout their length so as to give the desired stiffness and strength at the lower end of the skirt, but at the expense of a very substantial increase in the weight of the piston; or (2) the side walls of the piston were relieved by forming an external circumferential depression around the middle part of the skirt thus leaving the wall adjacent the head of adequate thickness for the piston ring grooves, and the wall adjacent the bottom of the skirt of adequate thickness to afford strength and, in some cases, provide a groove for a wiping ring, while unnecessary metal in the intermediate part of the wall was eliminated and a minimum weight attained; or (3) a compromise was effected with respect to the factors of weight on the one hand and strength and stiffness on the other by making the side walls moderately heavy throughout so that the weight was not increased as much as in the first case and sufficient strength and stiffness was provided to prevent failure of the pistons though not enough to insure entirely satisfactory operation.

Obviously neither of these three forms of construction is satisfactory for the first sacrifices lightness, which is the prime result sought in the use of the light metals, the second course, that is relieving the exterior of the piston walls, robs the piston of a large part of its bearing surface which is needed to withstand the lateral component of the piston rod thrust, while the third course is obviously unsatisfactory with respect to the sacrifice of lightness and the lack of adequate strength.

The object of my invention is the provision of a permanent mold for the casting of pistons of the character referred to in which the foregoing difficulties are overcome and by means of which it is possible to produce piston castings having a scientific disposition of the metal to secure a minimum weight, a substantially continuous external bearing surface, adequate internal ribs, if desired, for strengthening purposes and for cooling the head of the piston, and an internal circumferential reinforcement of the lower wall of the piston skirt to provide adequate strength and stiffness and to also make possible, if desired, the use of one or more wiping rings.

The manner in which I attain the foregoing results will be clear from the following description, in connection with the accompanying drawings, in which I set forth for purposes of explanation and illustration a preferred embodiment of the invention.

In carrying out my invention the main part or body of the mold forming the outer walls of the mold cavity, may be of any suitable construction but I prefer to employ, and have illustrated, a mold body formed for the most part like that of a mold invented by J. H. Bamberg, then of Buffalo, New York, and provided with a gate invented by A. B. Norton, then of Detroit, Michigan.

Referring to the construction shown in Figs. 1 to 13, inclusive, of the drawings, the body of the mold is shown as comprising a base 1 and complementary members 2 and 3 movable on the base toward and from each other. These three main sections of the mold body are preferably formed from cast iron.

Each of the complementary members 2 and 3 comprises an inner side wall 4, end walls 5 and 6 and top and bottom walls 7 and 8, respectively. Each of these members is also preferably formed with a series of internal webs or walls 9, 9, and 10 parallel to the end walls 5, 6. The outer side of each of the complementary members is formed by a plate 11 bolted to the casting. Handles 12, 12 are secured to plates 11, 11 so that the side members of the mold can conveniently be moved to and from operative position on the base.

Figures 1, 2:
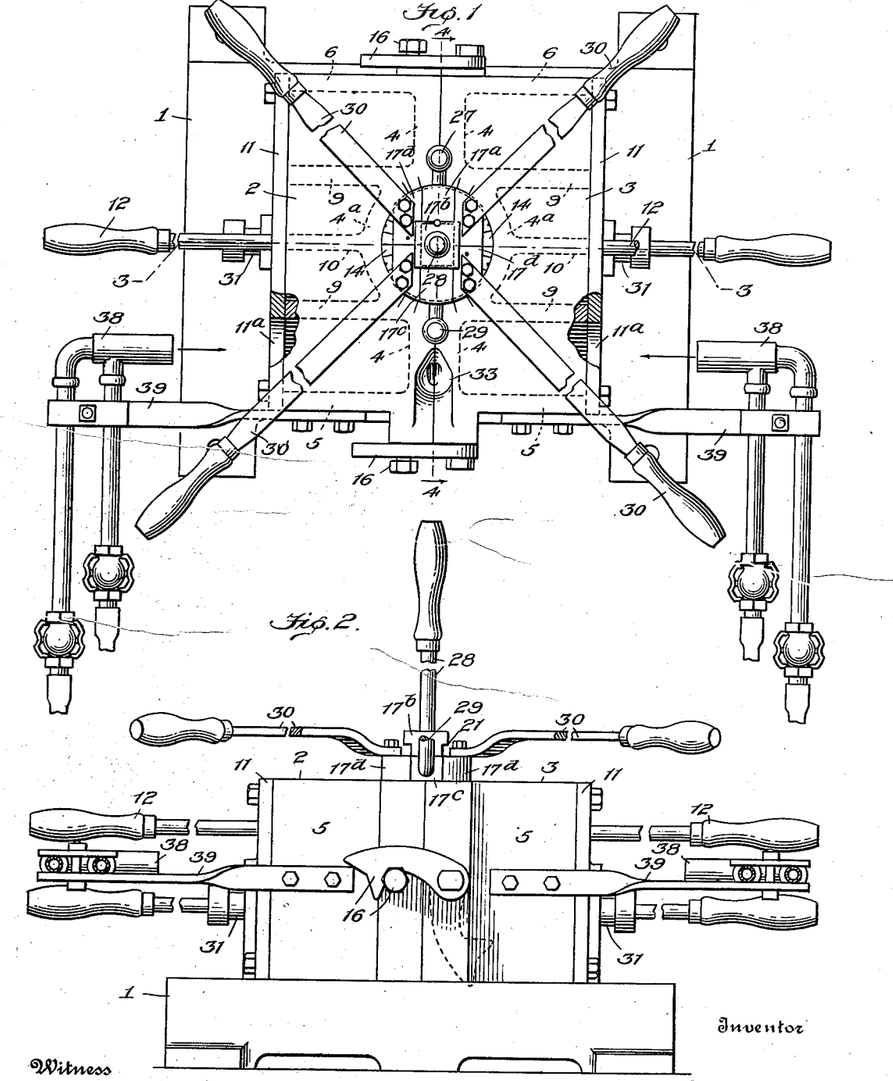
Figure 1 is a plan view of a piston mold embodying my invention, parts of the mold being broken away.
Fig. 2 is a side elevation of the mold.

The inner side walls 4 of the complementary members of the mold body mutually engage when said members are moved together, as shown in Fig. 1. Each wall 4 is formed between its ends with a semi-cylindrical portion $4^a$ and the lower parts of these semi-cylindrical walls $4^a$ form the outer side wall of the mold cavity, the bottom of said cavity being formed by the upper face of the base 1. The upper face of the base 1 is formed with a central depression $1^b$ which provides for a "work spot" on the head of the piston casting.

At $1^a$ the base 1 is provided with a circular shoulder and the bottom walls 8, 8 of the side members 2 and 3 are recessed at $8^a$ to receive the shoulder $1^a$ whereby the mold members 2, 3 are properly alined relatively to each other and also centered on the base plate 1. Supplemental means for alining the side members of the mold may be employed if desired, such for example, as pins 13 which extend upward from the base 1 to be engaged by recesses $4^b$ formed in the walls 4 of the side members of the mold.

Figure 3:
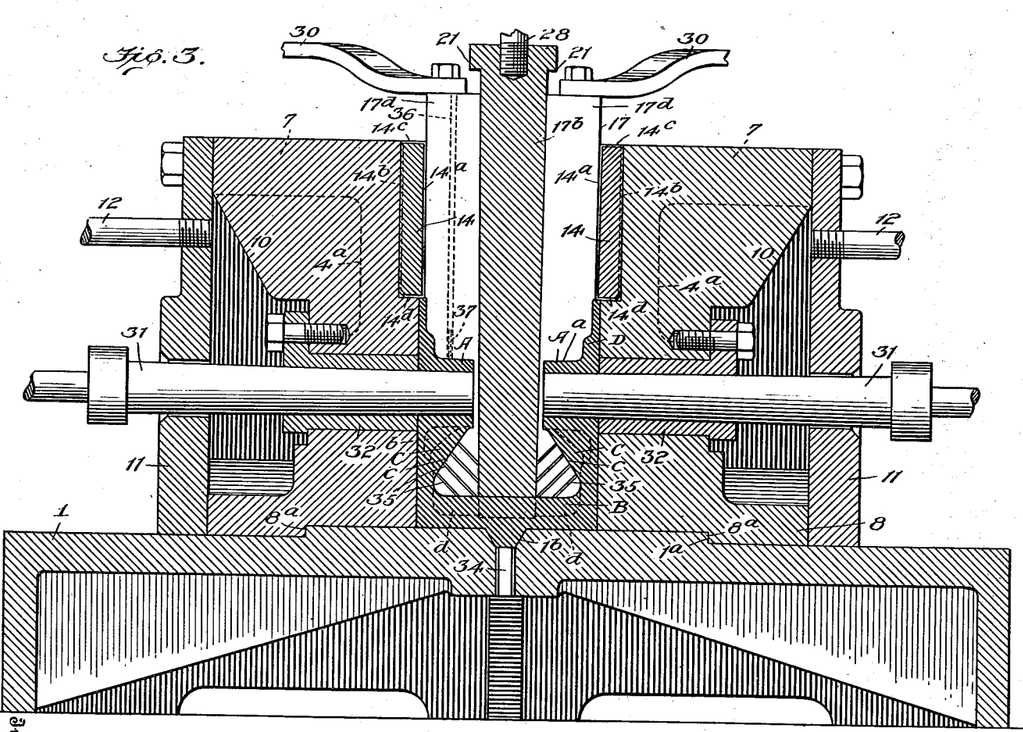
Fig. 3 is a cross section on the line 3—3 of Fig. 1.
Figure 5:
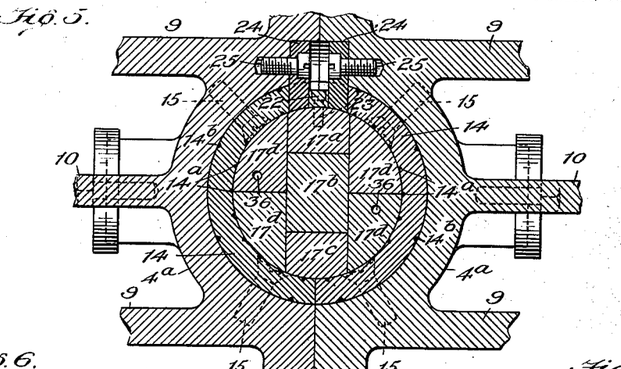
Figs. 5 and 6 are fragmentary horizontal sections on the lines 5—5 and 6—6, respectively, of Fig. 4.
Figure 6:
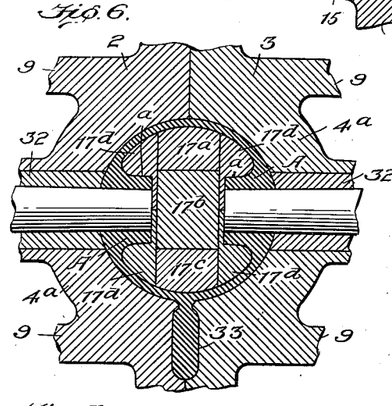

Above the mold cavity proper the semi-circular walls $4^a$ are recessed to receive inserts 14, 14 which are rigidly secured to the mold members 2, 3 by screws 15 as indicated in Fig. 5. These inserts, which are provided for the purpose of venting the mold cavity are preferably arranged to form the top wall of said cavity as indicated in Fig. 3.

At 16 are devices for locking the mold members 2 and 3 together in operative position on the base.

Figure 4:
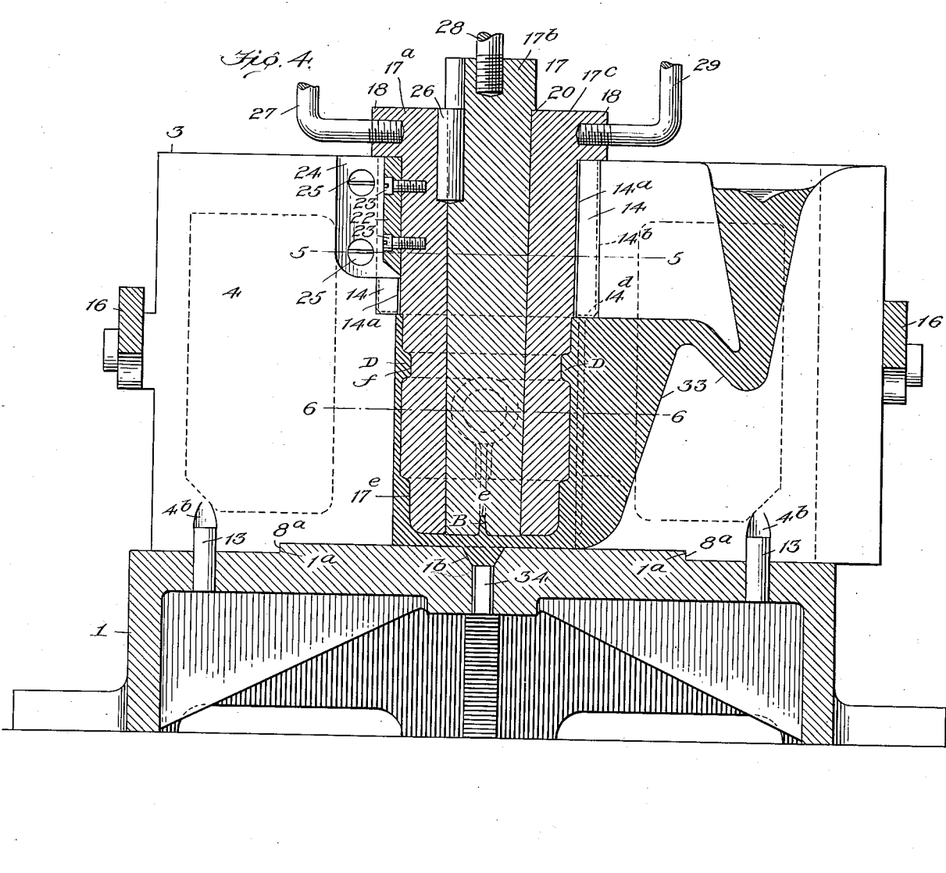
Fig. 4 is a cross section on the line 4—4 of Fig. 1.

The main core of the mold, which is designated as an entirety by the numeral 17, is preferably made of steel and comprises in the preferred construction shown, three middle sections $17^a$, $17^b$, $17^c$ which are arranged in a row extending, in the upper part of the core, from one side to the other of the cylindrical space between the upper parts of the walls $4^a$, i. e., the parts occupied by the inserts 14, (Figs. 4 and 5). The spaces at the two sides of the middle sections $17^a$, $17^b$, $17^c$ are occupied by two pairs of sections $17^d$, $17^d$ which, for the sake of convenience, I will call quarter sections.

Figure 11:
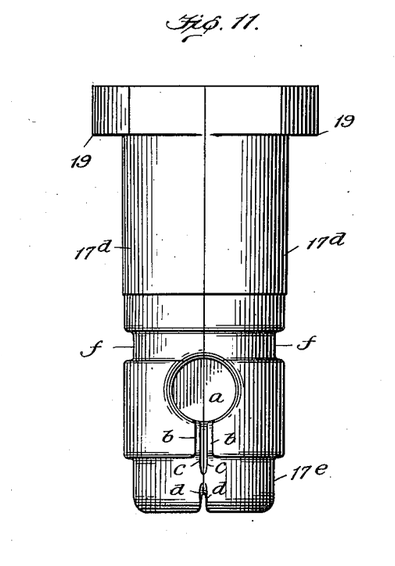
Fig. 11 is an outside elevation of one of the pairs of quarter sections of the mold core.
Figure 12:
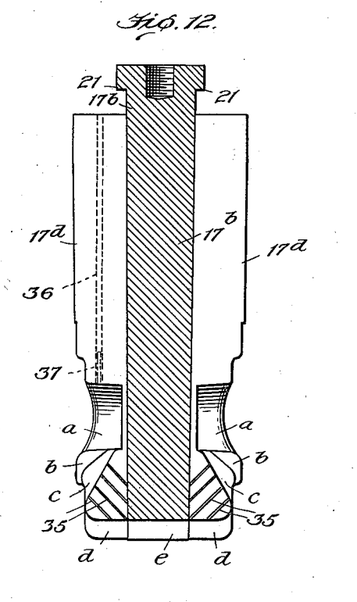
Fig. 12 is a central vertical section through the mold core.
Figure 13:
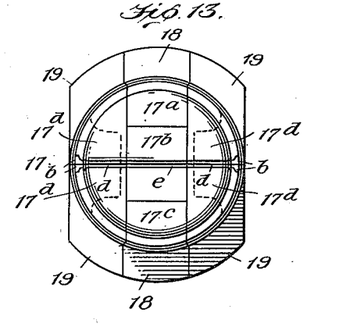
Fig. 13 is a bottom view of the core.

The core surfaces below the inserts 14 form the inner side and bottom walls of the mold cavity proper, said core surfaces being formed with various depressions to provide for the desired contour of the interior of the piston casting. As indicated in Figs. 11 and 12 the quarter sections of each pair are shaped with the recess $a$ to form the wrist pin bosses of the piston casting, one-half of the recess being formed in each quarter section of the core. This construction permits these sections $17^d$, $17^d$ to be moved laterally apart and disengaged from the bosses of the casting. In the construction shown the adjacent faces of the core sections $17^d$ are recessed at $b$, $c$ to form strengthening ribs between the pin bosses and the side walls of the piston, and at their lower ends each pair of quarter sections is recessed at $d$ and the interior middle section $17^b$ is recessed at $e$, said recesses $d$, $e$ providing for a strengthening and heat dissipating rib on the inner side of the piston head in a plane parallel to the axis of the pin bosses and in line with the ribs formed by the recesses $b$, $c$.

At its lower ends the core is of reduced diameter at $17^e$ to make the side wall of the piston casting adjacent the head of ample thickness to accommodate packing rings. And between the recesses $a$ for the piston pin bosses and the upper end of the mold cavity, the core is formed with a circumferential depression $f$ to provide an internal flange on the skirted piston near the open end thereof for the double purpose of strengthening and stiffening the lower end of the piston and providing space for a wiping ring.

It is exceedingly important that the core sections be rigidly and accurately supported in relation to each other and in relation to the body of the mold and I have made provision to this end. The dimensions of the core sections are such that when assembled the core snugly fits the cylindrical wall formed by the inserts 14 of the mold body. In addition the core sections $17^a$, $17^c$ are formed with outwardly turned flanges 18 which rest upon the top walls 7 of the mold body to limit the downward movement of said core sections, and the sections $17^d$ are provided with outwardly turned flanges 19 for a similar purpose. Also the interior core section $17^b$ is formed with shoulders 20 which engage the upper ends of the sections $17^a$ and $17^c$. The section $17^b$ is also formed with flanges 21 which are adapted to be engaged by a tool to facilitate the loosening of the central section when the core is withdrawn from the mold.

Figure 10:
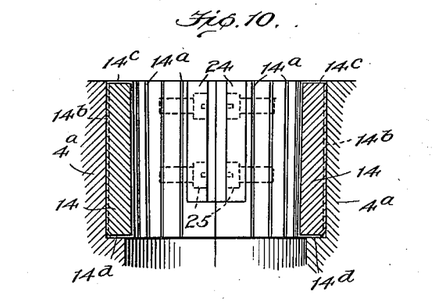
Fig. 10 is a fragmentary vertical section through the upper part of the mold body showing the venting inserts illustrated in Fig. 9 operatively assembled.

To insure the accurate positioning of the core circumferentially, the middle section $17^a$ is provided with a key 22 suitably secured as by screws 23, and this key engages a groove in the adjacent wall of the mold body formed between the wear plates 24, 24, the walls 4 of the side members 2 and 3 of the mold, as well as the inserts 14, being cut away to receive said wear plates 24 which are secured in position by screws 25 (Figs. 4, 5 and 10). A further means of accurately and rigidly locating the core sections is provided in the form of a pin 26 which is mounted in the upper side wall of the core section $17^b$ so as to extend laterally into engagement with a corresponding groove in the adjacent face of the core section $17^a$. The middle core sections $17^a$, $17^c$ are tapered on two sides toward their lower ends, the section $17^b$ is similarly tapered on all four sides and the respective sections are nicely fitted on their abutting faces to each other and on their outer curvilinear faces to the mold walls $4^a$ so that when the core is assembled in the mold body it is both accurately positioned and rigidly supported.

To facilitate the handling of the core parts the middle sections $17^a$, $17^b$, $17^c$ are provided with handles 27, 28 and 29, respectively, and the quarter sections $17^d$ are provided with handles 30.

For the purpose of coring out the pin bosses of the piston casting, a core pin 31, preferably of steel, is removably mounted in each of the mold sections 2 and 3 so as to project into the pin boss cavity. A steel wearing sleeve 32 is preferably provided for each of the pins, the pin and the bore of the sleeve being correspondingly tapered to insure a snug fit and the length of the pin being such that its inner end engages the metal of the quarter core sections as indicated in Fig. 3.

The body of the mold may be formed or provided with any suitable sort of gate for the introduction of the molten metal into the mold cavity. In the construction illustrated I employ a pouring gate 33 which communicates with the mold cavity from the top to the bottom thereof, the gate being formed by alining recesses formed in the adjacent parts of the walls 4 of the mold members 2 and 3.

To facilitate the escape of air and gases from the mold special venting means may be and preferably are provided. In the construction shown the inserts 14 are formed with grooves 14ª on their inner faces, with grooves 14ᵇ on their outer faces and with grooves 14ᶜ and 14ᵈ on their top and bottom faces, respectively. These grooves insure the escape of air or gases which find their way to the top of the mold cavity. Also the base 1 may be bored out centrally to receive a plug 34 which is provided with flats or grooves on its outer surfaces which constitute passages for the escape of air or gases downward through the base.

I have also formed grooves 35 in one or both of the adjacent faces of each pair of quarter sections 17ᵈ, as shown in Figs. 3 and 12. Then I preferably drill a passage 36 in one of each pair of the core sections 17ᵈ and insert in the lower part of said passage a grooved plug 37, thus providing one or more minute passages leading from the pin boss cavity upward to the top of the core. Air or gases rising in the rib recesses $d$ escape upward through the grooves 35, thence upward and around the core pins 31 and out through the passages 36.

It is usually desirable to provide for heating the body of the mold to maintain it at a suitable temperature and I have shown burners 38, 38 mounted on brackets 39, 39, said burners being arranged so that their flames are directed through openings 11ª in the plates 11 to heat the inner walls of the mold members 2 and 3 and particularly the walls 4 in which the gate 33 is formed, this arrangement insuring that the metal in the gate shall remain molten longer than that in the mold cavity.

The walls of the mold, including core parts, which constitute the walls for the mold cavity are suitably coated or treated in any well known manner to reduce as much as possible agitation of the molten metal as it flows into contact therewith and to insure proper setting of the metal within the cavity.

In the operation of the mold above described the members 2 and 3 are first moved together into operative position on the base 1. Next the main core 17 is introduced. The quarter sections 17ᵈ are first lowered into position in the mold cavity approximately in the positions they should occupy; then the middle section 17ª is inserted and, by reason of its interlocking engagement with the core body, serves to adjust the quarter sections circumferentially more exactly to their proper positions; then the middle section 17ᶜ is introduced, and lastly the interior middle section 17ᵇ is inserted so as to accurately position each and all of the core sections by reason of their mutual engagement. The locking devices 16 are then driven tightly home so as to clamp the main core sections and render the whole structure rigid. Next the core pins 31 are inserted.

The temperatures at which the various parts are maintained will depend largely upon the nature of the metal or alloy to be cast. But assuming that the burners 38 have been operated to heat the mold parts to the desired temperature, the mold is now ready to receive the molten metal. Said metal is brought to the mold in any suitable manner, as by a ladle, and is poured into the inlet of the gate 33 through which it enters the mold cavity. I prefer to use a gate 33, such as illustrated in the drawings, because of the peculiar advantages possessed by it in connection with the casting of an article such as an internal combustion engine piston having inwardly extending bosses, ribs and flanges. The construction of the gate is such that a liquid seal is formed as the metal flows through it and this seal tends to preclude entrance of air and gases into the mold cavity and also to materially reduce splashing of the metal within the gate during pouring. Splashing is further reduced by forming the gate wall as shown so that the metal flows smoothly along it and thence into the mold cavity. Air and gases within the mold cavity escape through the vents as hereinbefore described. The metal rises from the bottom of the mold cavity upward until it engages with the lower end of the inserts 14 when the casting is completed, having in the present case two inwardly extending oppositely disposed tubular bosses A, A, a heat dissipating rib B on the inner wall of the piston head, two strengthening ribs C, C, between the side walls of the casting and the bosses A, A, and an internal circumferentially extending flange D which serves to strengthen the lower part of the piston skirt and provide the necessary thickness of wall for a wiping ring. The weight of the metal in the upper portion of the gate serves to force the metal into the mold cavity to complete the castings, the upper end wall of the casting being substantially in line with the upper portion of the gate which directly feeds it. In addition to the trapping out of air, this construction of gate serves to prevent oxidizing of the metals poured and other foreign materials from entering the mold cavity.

Figure 7:
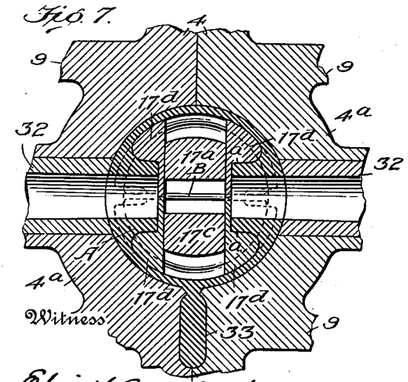
Fig. 7 is a view similar to Fig. 6 but showing one of the middle core sections removed and the other middle core sections moved laterally inward to illustrate the manner of freeing the same for removal.
Figure 8:
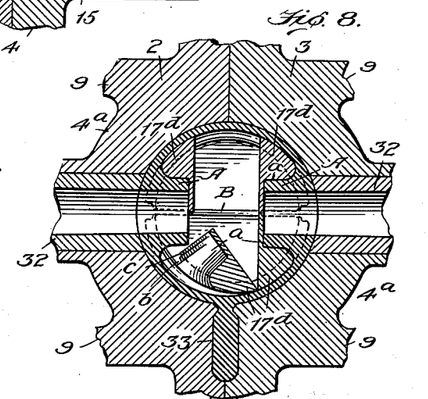
Fig. 8 is another view similar to Fig. 6 but showing all the middle core sections removed so as to afford clearance for the removal of the quarter sections of the core, one of the latter being swung laterally into a position freeing it for lengthwise movement.
Figure 9:
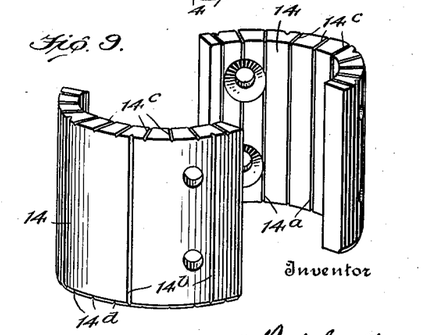
Fig. 9 is a detached perspective view of the inserts, used for venting the upper end of the mold cavity.

When the metal of the casting has set sufficiently the core pins 31 are removed by withdrawing them endwise. Next the inside section 17ᵇ of the main core is removed by withdrawing it axially or longitudinally upward. Then the outside metal core sections 17ª and 17ᶜ are moved laterally inward, the necessary clearance being afforded by the upward movement, and preferably entire removal, of the section 17ᵇ, and when they have cleared the internal flange D of the casting, as shown in Fig. 7, they are drawn longitudinally upward and out of the mold. Next, by grasping the handles 30 of one pair of the quarter sections, said sections are swung laterally into the position indicated for one of said sections in Fig. 8. In this view the quarter section is clear of the pin boss but not of the circumferential flange D of the casting. However, by tipping the upper end of the section radially inward it is made to clear the flange D, whereupon it can be withdrawn longitudinally from the mold. The first pair of quarter sections are thus withdrawn simultaneously, or nearly so, and thereupon the second pair can be freely swung laterally clear of the adjacent boss A of the casting and then withdrawn longitudinally from the mold.

After the removal of the core 17 the mold members 2 and 3 are unlocked and drawn apart far enough to permit the casting to be withdrawn, whereupon they are again moved into engagement with each other, locked and the operation repeated.

In Figs. 14 to 17 inclusive I have illustrated a modified form of construction. The base member 1$^a$ and the side members 2$^a$, 3$^a$ are substantially the same in construction as the corresponding parts of the mold described above and therefore need not be described in detail. In this second construction the core 40 is made up of three middle sections 40$^a$, 40$^b$ and 40$^c$ and four quarter sections 40$^d$ which are similar in many respects to the sections of the core 17 in the first form of construction. But the construction of the core 40 differs in other respects which I will now point out.

Instead of the circumferential recess $f$ which in the first form of construction is disposed at a substantial distance from the open end of the piston casting and is designed to afford a form of wall providing for wiping ring grooves as well as to strengthen and stiffen the side walls of the piston at its open end, I form the core with a circumferential depression $f'$ which is disposed at the extreme upper end of the mold cavity so as to form simply a strengthening and stiffening flange at the bottom of the side wall of the piston.

Figure 14:
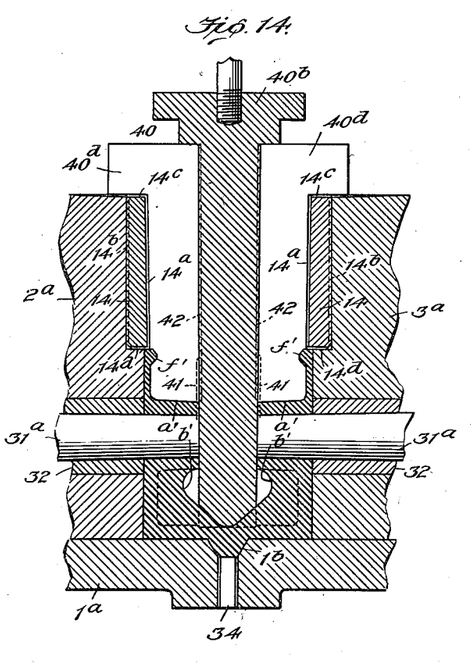
Fig. 14 is a fragmentary vertical section similar to Fig. 3 but showing a modified form of construction.
Figure 15:
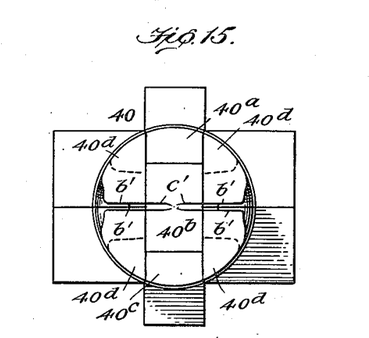
Fig. 15 is a bottom view of the core shown in Fig. 14.
Figure 16:
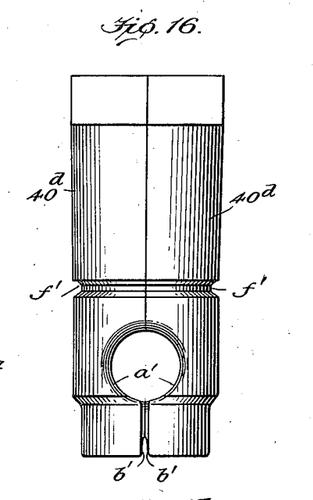
Fig. 16 is an outside elevation of one of the pairs of quarter sections of the core shown in Fig. 14.
Figure 17:
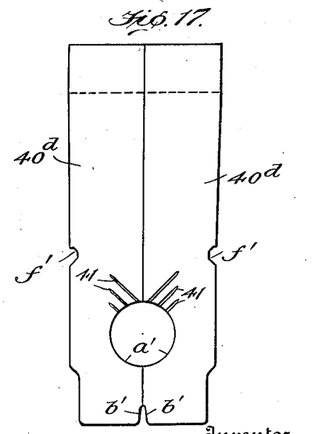
Fig. 17 is an inside elevation of the core sections shown in Fig. 16.

The quarter sections of each pair thereof have their adjacent faces recessed to form a pin boss cavity $a'$ but in this case the cavity passes entirely through the quarter sections, its inner wall being formed by a face of the core section 40$^b$. In addition, combined strengthening and heat dissipating ribs of modified form are employed, the quarter sections of the core being formed with adjacent recesses $b'$, $b'$, and the lower end of the core section 40$^b$ with recesses $c'$, $c'$ which, together with the recesses $b'$, form the piston casting with two ribs joining the head, side walls and pin bosses as indicated in Fig. 14.

With a rib construction such as last referred to, it is obvious that the rib recesses afford passage for air and gases upward from the bottom of the mold cavity to the pin boss cavities and thence around the core pins 31$^a$ to the upper sides of the boss cavities. On the inner faces of the quarter sections of the cores I preferably form vent grooves 41, 41 leading from the pin boss recesses upward and outward to lines marking the corners of the adjacent core section 40$^b$. The corners of this section are slightly beveled from the pin boss cavities upward to the top of the core thus forming vent passages 42, 42 with which the grooves 41 communicate.

It will be understood that the several sections of the core 40 are provided with handles as in the case of the first form of construction and the mold is operated in substantially the same manner as set forth in connection with the first form of construction.

In the interest of clearness the size of the venting grooves or passages is exaggerated as shown in the drawings, as will readily be understood by those skilled in the permanent mold art.

It will be observed that in my improved mold, while the main core is divided into a relatively large number of parts, the core structure when assembled in the mold is, nevertheless, very firmly and rigidly secured and exactly positioned. It will be seen that the row of middle core sections, preferably three in number, act, by virtue of their mutual engagement and their engagement and interlocking with the walls of the mold body, to insure their own accurate disposal and firm support and at the same time accurately position and secure the quarter sections of the mold. Furthermore, these vitally important results are secured with core sections of such relative forms and dimensions that after the withdrawal of an inner section clearance is provided for the lateral movements of the outer sections sufficient to disengage the latter from all internal projections on the side walls of the casting, including not only the usual pin bosses but also internal projections in planes transverse to the axis of the piston pin and even continuous circumferential internal projections such as have been illustrated herein.

To those skilled in the art of casting metals and their alloys, it will be apparent that my improved mold not only possesses the advantages of the permanent molds used prior to my invention, such, for example, as the molds devised by Messrs. J. H. Bamberg and A. B. Norton, previously referred to, but is adapted for the production of cup shaped castings having internal projections of a complicated character. And in particular my improvements make it possible to cast in a permanent mold skirted pistons having internal strengthening or wiping ring flanges in the lower part of the piston walls as well as internal piston pin bosses and strengthening and heat dissipating ribs at or adjacent the head of the piston casting. Thus I am enabled to cast skirted pistons for internal combustion engines in which the metal is disposed scientifically to secure adequate external bearing surface, and heat dissipating capacity as well as to secure the necessary strength with a minimum weight of metal.

It is to be understood that the construction of my improved mold can be varied widely without departing from my invention, and that the specific forms of construction disclosed have been shown simply for the purposes of explanation and illustration.

What I claim is:

1. In a permanent mold for piston castings, the combination with the permanent mold body having a cavity adapted to form the outer side wall of the piston casting and having a gate through which molten metal may be introduced into the cavity, of a permanent sectional core supported on the mold body and extending into its cavity to form the inner side wall of the piston casting, the said core comprising a series of more than two sections arranged in a row across the mold cavity with two of them engaging the inner side wall of the casting, and a third, interior section between the said two, and the core having also additional sections arranged on opposite sides of the said row of sections to engage the inner side wall of the casting, the said additional sections being exteriorly formed with cavities to form a pair of pin bosses on the inner side wall of the piston casting with their common axis at right angles to the said row of core sections and all of the exterior sections of the core being formed with alining depressions arranged to form an inwardly extending circumferential flange on the inner side wall of the piston casting, the several sections of the core being formed and arranged so that the said interior section when moved endwise affords clearance to permit the outer sections of the core to be successively moved laterally out of engagement with the internal projections of the piston casting and then endwise from said casting.

2. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold body within a surrounding wall thereof and extending into the cavity of the mold to form the inner head and side walls of the piston casting, said core having its outer surface formed with cavities to form a pair of pin bosses on the inner side walls of the piston casting and with a circumferential depression arranged to form an inwardly extending circumferential flange on the inner side walls of the piston casting, the said core also having a series of more than two sections arranged in a row across the mold cavity with two of them engaging the inner side wall of the casting and the said core-supporting wall of the mold body at opposite points, one of the two having an interlocking engagement with the mold body and a third, interior section between said two, and the core having also sections arranged on opposite sides of said row of sections to engage the inner side wall of the casting, the several sections being formed and arranged so that the said interior section when moved endwise affords clearance to permit the outer sections of the core to be successively moved laterally out of engagement with the pin bosses and the inwardly extending flange of the piston casting and then endwise out of said casting.

3. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold body within a surrounding wall thereof and extending into the cavity of the mold to form the inner head and side walls of the piston casting, said core having its outer surface formed with cavities to form a pair of pin bosses on the inner side wall of the piston casting and with a circumferential depression arranged to form an inwardly extending circumferential flange on the inner side wall of the piston casting, the said core also having a series of three sections arranged in a row across the mold cavity with the two outside sections engaging the inner side wall of the casting and the said core-supporting wall of the mold body at opposite points, one of said two sections having interlocking engagement with said core supporting wall and with the third, interior section of said series, and the core having also sections arranged on opposite sides of said row of sections to engage the inner side wall of the casting, the several sections being formed and arranged so that the said interior section when withdrawn endwise affords clearance to permit the outer sections of the core to be successively moved laterally out of engagement with the pin bosses and the inwardly extending flange of the piston casting and then endwise out of said casting.

4. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold body within a surrounding wall thereof and extending into the cavity of the mold to form the inner head and side walls of the piston casting, the core comprising three middle sections arranged in a row across the mold cavity with the two outside sections engaging the inner side wall of the casting and the said core supporting wall of the mold body at opposite points and comprising also two pairs of quarter sections arranged respectively on the opposite sides of the middle sections, the quarter sections of each pair having their abutting faces recessed to form a cavity for one of the two pin bosses on the inner side wall of the piston casting, and the exterior sections of the core being formed with a circumferential depression to form an internal circumferential flange on the side wall of the piston casting, the inside middle section of the casting being movable endwise to form a clearance permitting the lateral movement and endwise withdrawal first of the other middle sections and then of the quarter sections.

5. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold body within a surrounding wall thereof and extending into the cavity of the mold to form the inner head and side walls of the piston casting, the core comprising three middle sections arranged in a row across the mold cavity with the two outside sections engaging the inner side wall of the casting and the said core supporting wall of the mold body at opposite points and comprising also two pairs of quarter sections arranged respectively on the opposite sides of the middle sections, the quarter sections of each pair having their abutting faces recessed to form a cavity for one of the two pin bosses on the inner side wall of the piston casting and a strengthening rib or the like extending between said boss and the piston head, and the exterior sections of the core being formed with a circumferential depression to form an internal circumferential flange on the side wall of the piston casting, the inside middle section of the casting being movable endwise to form a clearance permitting the lateral movement and endwise withdrawal first of the middle sections and then of the quarter sections.

6. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold body and extending into the cavity of the mold to form the inner head and side walls of the piston casting, said core comprising a middle section adapted to be withdrawn endwise from the casting and two pairs of quarter sections arranged on opposite sides of the middle section, the quarter sections of each pair having their abutting faces recessed to form a cavity for one of the two internal pin bosses on the side wall of the piston casting and being formed also with venting grooves in their abutting faces leading from the head wall of the casting to the lower side of the pin boss cavity, and the core sections having also venting outlets leading from the upper sides of the said pin boss cavities to the exterior of the mold.

7. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold and extending into the cavity of the mold to form the inner head and side walls of the piston casting, said core comprising a middle section adapted to be withdrawn endwise from the casting and two pairs of quarter sections arranged on opposite sides of the middle section, the quarter sections of the core having their mutually abutting faces recessed to form cavities for pin bosses on the inner side walls of the piston casting and an internal rib on the head of the piston casting, and the quarter sections of each pair being formed with venting grooves in their mutually abutting faces leading from the rib cavity to the lower side of the adjacent pin boss cavity, and the core parts having venting outlets leading from the upper sides of the pin boss cavities to the exterior of the mold.

8. In a permanent mold for skirted piston castings, the combination with a permanent mold body having a cavity adapted to form the outer walls of the piston casting and having a gate through which molten metal may be introduced into the cavity, of a permanent core supported on the mold and extending into its cavity to form the inner walls of the piston casting, the said core being divided longitudinally into seven parts six of which directly contact exteriorly with the inner side wall of the casting and interiorly with the seventh interiorly arranged section, certain of the six exterior sections of the core being exteriorly formed with cavities to form a pair of pin bosses on the inner wall of the piston casting and all of the exterior sections of the core being formed with alining depressions arranged to form an inwardly extending circumferential flange on the inner side wall of the piston casting, the several sections of the core being formed and arranged so that the interior section when moved endwise affords clearance to permit the outer sections of the core to be successively moved laterally out of engagement with the internal projections of the piston casting.

9. In a permanent mold for skirted piston castings, the combination with a permanent mold body having a cavity open at one end and adapted to form the outer head and side walls of the piston casting and having a gate through which molten metal can be introduced into the cavity, of a permanent sectional core supported on the mold body within a surrounding wall thereof and extending into the cavity of the mold to form the inner head and side walls of the piston casting, said core having its outer surface formed with cavities to form a pair of pin bosses on the inner side wall of the piston casting and also a circumferential depression arranged to form an inwardly extending circumferential flange on the inner side wall of the piston casting, the said core also comprising a series of more than two sections arranged in a row across the mold cavity with the two outside sections engaging the inner side wall of the casting and the said core supporting wall of the mold body at opposite points, the said row of core sections and the mold body being held in operative relation by means comprising an interlocking connection between one of the said outside sections and the core supporting wall of the mold body and by an interlocking connection between said outside section and the adjacent interior section of the series, and the core having, also, sections arranged on opposite sides of said row of sections to engage the inner side wall of the casting, the several sections being formed and arranged so that the endwise movement of the interior section affords clearance to permit the other sections of the core to be successively moved laterally out of engagement with the pin bosses and the inwardly extending flange of the piston casting and then endwise out of said casting.

In testimony whereof I affix my signature.

FREDERIC A. PARKHURST.